United States Patent [19]

Phillips

[11] Patent Number: 4,974,379
[45] Date of Patent: Dec. 4, 1990

[54] TEXTURAL BREAK FOUNDATION WALL CONSTRUCTION MODULES

[75] Inventor: Steven J. Phillips, Kennewick, Wash.

[73] Assignee: Westinghouse Electric Corp., Pittsburgh, Pa.

[21] Appl. No.: 446,748

[22] Filed: Dec. 6, 1989

[51] Int. Cl.$^5$ .................. B09B 1/00; G21F 9/24
[52] U.S. Cl. .................. 52/169.5; 52/169.7; 52/742; 376/272; 405/128
[58] Field of Search .......... 405/52, 128, 53, 54, 405/55, 267, 272, 279, 281; 52/169.7, 169.6, 169.14, 264, 378, 249, 405, 742, 562, 169.5; 376/272

[56] References Cited

U.S. PATENT DOCUMENTS

| | | | |
|---|---|---|---|
| 1,835,417 | 12/1931 | Mauterer | 405/279 |
| 3,440,780 | 4/1969 | Adam | 52/588 |
| 3,986,310 | 10/1976 | Broek | 52/588 |
| 4,136,493 | 1/1979 | Bradford | 52/169.7 |
| 4,231,201 | 11/1980 | Harnois | 52/742 |
| 4,263,765 | 4/1981 | Maloney | 52/405 |

Primary Examiner—John E. Murtagh
Attorney, Agent, or Firm—E. F. Possessky

[57] ABSTRACT

Below-grade, textural-break foundation wall structures are provided for inhibiting diffusion and advection of liquids and gases into and out from a surrounding hydrogeologic environment. The foundation wall structure includes a foundation wall having an interior and exterior surface and a porous medium disposed around a portion of the exterior surface. The structure further includes a modular barrier disposed around a portion of the porous medium. The modular barrier is substantially removable from the hydrogeologic environment.

16 Claims, 2 Drawing Sheets

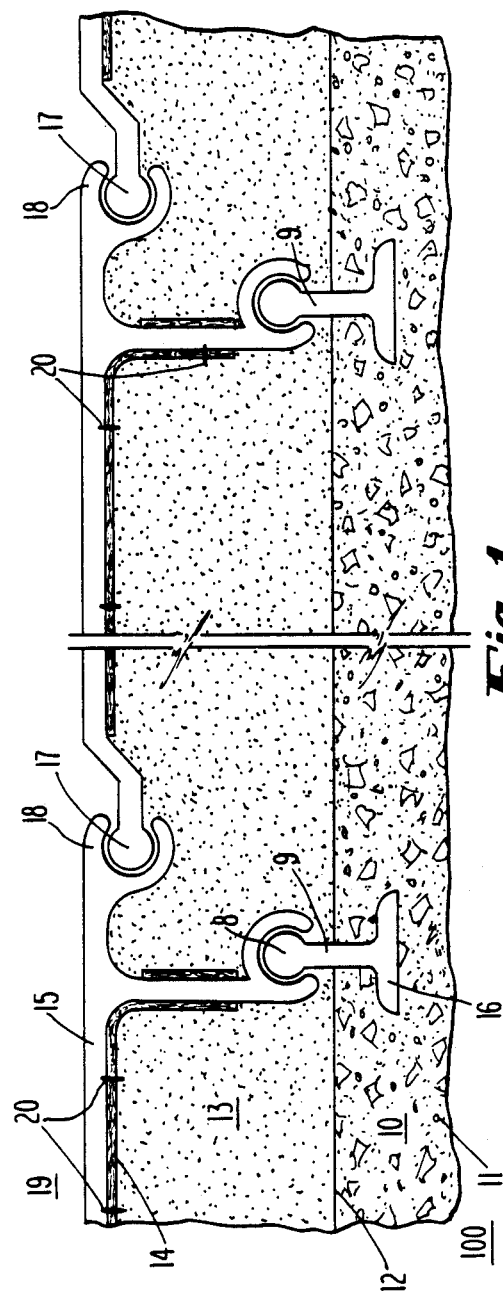
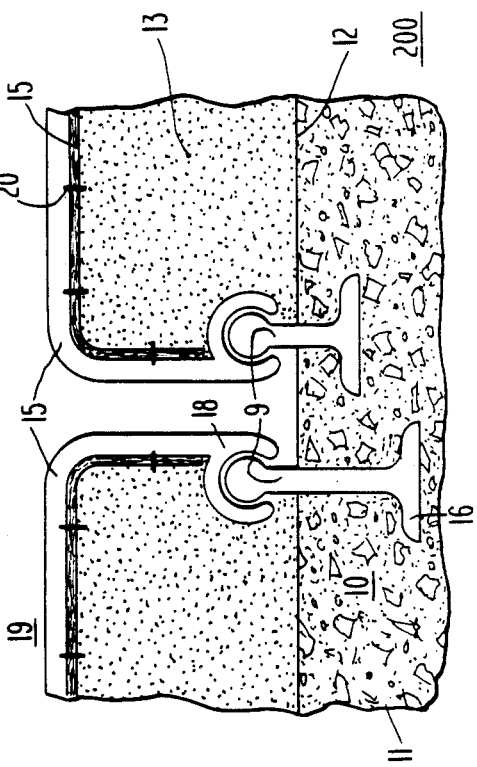

TEXTURAL BREAK FOUNDATION WALL CONSTRUCTION MODULES

FIELD OF THE INVENTION

This invention relates to textural material breaks, such as course-textured rock between fine-textured soil and structural foundation walls, and in particular to providing a modular arrangement for installing textural breaks.

BACKGROUND OF THE INVENTION

Diffusion from and into underground sources as well as the advection of liquids through foundation walls has been known to occur. This has presented cause for concern in connection with earth-berm construction and foundations, such as vaults and tanks, that contain radioactive or hazardous waste.

Presently, the diffusion and advection of gaseous and liquid materials between underground foundation walls and the surrounding hydrogeologic environment may be alleviated with textural break walls consisting of a course textured geologic medium disposed between the foundation wall and the outlying soil. This medium may consist of particles ranging from the size of sand to the size of gravel and is effective as a barrier to significantly reduce or eliminate diffusion and advection. Such barriers may also be constructed for keeping drainage water from saturating earth-berm house foundations and interiors, and for enclosing structures containing hazardous and radioactive waste.

As environmental regulations for controlling and containing toxic waste become more prevalent, the need for larger scale and more developed construction techniques for producing foundation walls will increase. As yet, construction materials and equipment have not been conceived, developed or tested for the application of textural break barriers to large building foundations in the order of a few meters up to and in excess of 30 meters in depth.

SUMMARY OF THE INVENTION

This invention provides below-grade, textural-break foundation wall structures and methods for the fabrication of such structures for enclosing large building foundations. The textural-break structures of this invention include a foundation wall having an interior and exterior surface thereon and a porous medium disposed around a portion of this exterior surface. The structure further includes modular barrier components disposed around a portion of the porous medium which are substantially removable from the hydrogeologic environment.

In addition, this invention relates to a method of inhibiting diffusion and advection of liquids and gases between a foundation wall and its surrounding hydrogeologic environment which includes providing a foundation wall having an interior and exterior surface thereon and guide rail means anchored therein. The method next disposes a porous medium around a portion of the exterior surface of the foundation wall. Then a modular barrier means is disposed around a portion of this porous medium and connected to the guide rail means.

Accordingly, an effective and inexpensive construction method for providing textural-break foundation walls is provided by this invention. The vertical textural-break barriers of this design can be constructed for deep foundations in the order of a few meters to an excess of 30 meters. The modular design can be used repeatedly, and can be designed with retrievable and interchangeable webs.

It is, therefore, an object of this invention to provide a below-grade, textural-break structure for inhibiting diffusion and advection of gases and liquids between a foundation wall and a surrounding hydrogeologic environment.

Another object of this invention is to provide a textural-break having modular components to facilitate a multitude of design concepts.

An additional object of this invention is to provide a structurally sound textural break construction procedure.

With these and other objects in view, this invention resides in the novel construction, combination, arrangement of parts and methods substantially as hereafter described and more precisely defined by the attached claims.

BRIEF DESCRIPTION OF THE DRAWINGS

The accompanying drawings illustrate a complete embodiment of the invention thus far devised for the practical application of the principles thereof, and which:

FIG. 1: is a partial top elevation of a preferred below-grade, textural-break foundation wall structure of this invention;

FIG. 2: is a partial top elevation of a second embodiment of the below-grade, textural-break foundation wall structure of this invention.

DETAILED DESCRIPTION OF THE INVENTION

Figure 3:
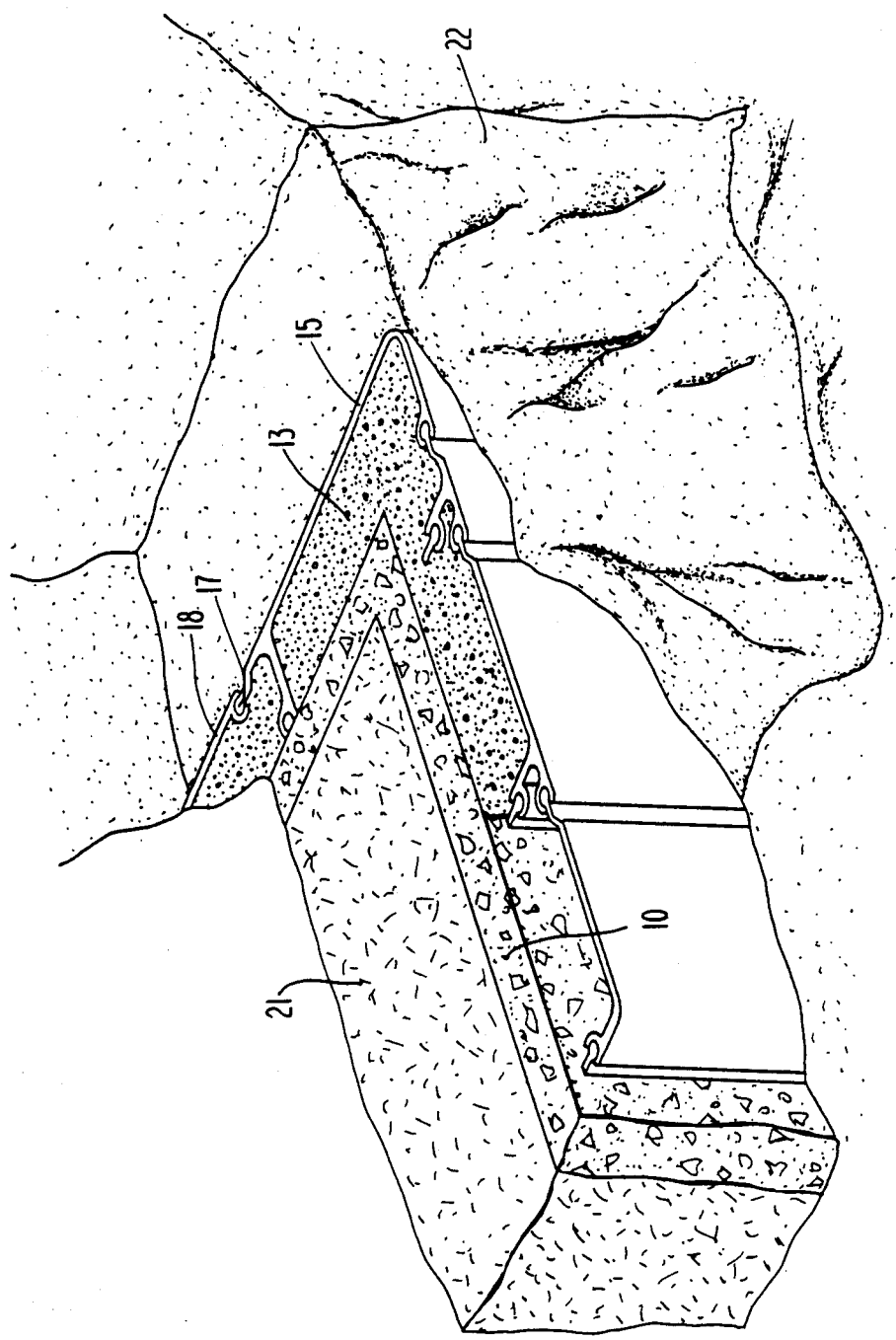
FIG. 3: is a partial perspective of a complete textural-break foundation wall structure illustrating how the components are arranged prior to and after backfilling with soil.

The present invention provides textural-break foundation wall structures and methods for their fabrication as well as modules for the preparation of textural-breaks in hydrogeologic environments. In the first embodiment of the invention, the structure includes a foundation wall having an interior and exterior surface with a porous medium disposed around a portion of this exterior surface. Disposed around the porous medium is a modular barrier means which is substantially removable from the surrounding hydrogeologic environment.

In the second preferred embodiment of the invention, the structure includes a concrete foundation wall having an interior containment area and an exterior surface disposed in contact with a porous medium around substantially all of the exterior surface. The structure also includes a geofabric material wrapped around the porous medium, and further includes a modular barrier which comprises a plurality of interlocking angle webs connected to the foundation wall by a plurality of vertically-oriented guide rails. The interlocking angle webs comprise web hooks for selectively attaching the geofabric material to the modular barrier. The interlocking webs include an oblique angular surface for facilitating removal of the webs from the hydrogeologic environment.

With reference to the Figures, and in particular to FIG. 1 thereof, there is shown a preferred textural-break foundation wall structure 100 which includes a concrete foundation wall 10 having an interior containment area demarcated by interior surface 11 and an exterior surface 12. Surrounding the concrete foundation wall 10 is a porous medium 13, preferably comprising gravel, sand, or stone. Disposed around the porous medium 13 is a geofabric material 14, which is preferably placed in intimate contact with the porous medium 13. The geofabric material 14 preferably comprises a porous, woven polymer, e.g. fiberglass, polyethylene, or polypropylene. Disposed around the porous medium 13 and geofabric material 14 is a modular barrier 15 comprising a plurality of interlocking angle webs, preferably, constructed of a metal, such as aluminum, steel or a structural polymer, such as plexiglass or polyethylene sheets. Web hooks 20 are also employed for selectively attaching the geofabric material 14 to the modular barrier 15. The interlocking angle webs of this embodiment preferably comprise an oblique, angular surface for facilitating removal of the webs from the hydrogeologic environment. As described in the embodiment of FIG. 1, the concrete foundation wall 10 can include guide means 9 preferably partially embedded into the concrete foundation wall 10. The guide means can include an anchor portion 16 for securing the guide means 9 to the foundation wall 10. The guide means 9 also can include a substantially vertical guide rail 8 for providing vertically controlled removal of the modular barrier 15 out of the hydrogeologic environment 19.

The anchor portions 16 of the guide means 9 are embedded and tied into the concrete wall structure of the foundation during construction. Guide means 9 may optionally include two or more elements connected with a fastener. In a preferred construction, guide means 9 comprises separate anchor portions 16 and guide rails 8, wherein the anchor portions are tied to the rebar of the concrete foundation wall and are relatively flush with the concrete form. After the concrete is cured, and the form is removed, the guide rail 8 can be fastened to the anchor portion 16, i.e., with a bolt to complete the guide means 9. The completed guide means 9 functions to permit attachment of the removable interlocking webs component to the foundation wall prior to backfilling with soil. After backfilling, the guide means 9 also permit vertically controlled removal of the angle web component. The guide means 9 preferably remains attached to the foundation wall.

The modular barrier 15 of FIG. 1 preferably comprises a plurality of interlocking webs, each including a vertically disposed male interlocking member 17, also referred herein as a vertically oriented guide rail similar to guide rail 8. The male interlocking member 17 preferably is disposed into a complimentary guide rail female-member 18 of an adjoining interlocking web for constructing the barrier assembly 100.

The interlocking angle webs described above are installed via the guide rails from the bottom of the foundation wall to slightly above the final construction grade. These serve to contain the coarse-textured material, separating it from the interior foundation wall and the outer backfill soil material The angle webs form a semi-continuous, or continuous wall of interlocking components for surrounding the foundation wall of a given structure. Depending on the design selected, the interlocking angle web components may have guide rails attached in an arrangement that interlocks each angle web component to its adjacent component.

Slip plugs or hooks 20 are angled downwardly trending on the interior surface of interlocking webs of the preferred construction. Attached to these hooks 20 preferably is a geofabric consisting of woven glass or other long-lived porous woven geotextile material. In alternative embodiments this geofabric material has been deleted from the construction. In the preferred embodiment, however, this fabric serves to assure the discontinuity of texture between the course-geologic medium within the interlocking angle webs and the outlining backfill soil. The angle and trend of the hooks 20 allows retrieval of the interlocking angle web while leaving the geofabric in place.

Referring to FIG. 2, there is shown an alternative textural-break foundation wall structure embodiment 200. In this embodiment, the modular barrier 15 is broken into discrete containment zones which contain the preferred porous medium 13 of this invention. Although this particular embodiment 200 does not provide 100% containment, it may more readily facilitate modular construction.

With respect to FIG. 3, there is shown in perspective, an overall view of a preferred foundation wall structure for containing hazardous waste 21. The particular embodiments illustrate how backfill soil 22 is disposed about the modular barrier 15. A concrete ceiling can be placed neatly over the concrete foundation wall 10 to provide containment. The surrounding backfill soil 22 can be disposed around the modular barrier to provide a completed containment area.

After backfilling, a vibratory hammer extractor attached to the boom of a crane can be applied to the foundation wall structure for severing the individual interlocking webs out of the hydrogeologic environment. These webs can then be recycled for use in producing another textural break foundation structure. Interlocking webs can also be designed and used for circular tanks and structures of variable morphologies.

One preferred procedure for assembling the modular webs of this invention for a hazardous waste disposal vault which controls both heat transfer and diffusion of contaminants out of the vault, is delineated as follows:

1. A 1000 cubic meter concrete vault consisting of a footing, walls, and an arched top is constructed in an excavation of about 20 meters (60 feet) deep. Guide rail anchors are installed during concrete wall preparation. They are installed in vertical arrays every meter along the perimeter of the vault. Subsequent to removal of the concrete forms, guide rails are installed into the anchors with bolts. A thermal installation sheet is placed in contact with the foundation wall through the full height of the wall.

2. Interlocking angle web pieces are laid on the exterior surface on the floor of the excavation. A glass geofabric is rolled onto the interior wall of the angle web while applying slight pressure so as to force the weave of the geofabric onto the web hooks.

3. A crane is used to lift angle webs into place by sliding them from the top of the structure through the guide rails to the excavation grade where they rest on the wall footing.

4. The perimeter of the foundation wall is backfilled with previously excavated soil material. This is accomplished easily with a crane and slip bucket or alternative equipment.

5. A large vibratory hammer-extractor actuated by a preferred 50 metric ton crane is clamped to each angle web component using hydraulic jaws. While imposing an upward force with the crane, the hammer-extractor dynamically removes each angle web component through its vertical extent and places it on a large trailer for shipment to the next site. This is repeated until all the components are removed.

6 Another layer of geofabric is then placed over the top of the rock fragments and installation wall to provide continuity of the textural-break.

Physical models of the preferred construction methods have been used to evaluate the concept of withdrawal of the angle web with geofabric. Plexiglass and polypropylene were used for the angle web and geofabric, respectively. Web hooks were made of wire and attached to the plexiglass with adhesive Withdrawal of the model angle web was conducted easily. The geofabric remained in place and effectively separated the fine sand in the model from the crushed rock between the angular web and the model foundation wall.

From the foregoing, it can be realized that this invention provides facilitated construction techniques for fabricating textural-break barriers which are acceptable to building code requirements and other regulatory standards. The construction techniques described herein are also time and cost effective when compared with hand construction methods.

I claim:

1. A below-grade, textural-break foundation wall structure for inhibiting diffusion and advection of liquids and gases into and from a surrounding hydrogeologic environment, comprising:
   (a) a foundation wall having an interior and exterior surface thereon;
   (b) porous medium means disposed around a portion of said exterior surface;
   (c) modular barrier means disposed around a portion of said porous medium means, said modular barrier means being substantially removable from said hydrogeologic environment; wherein said foundation wall comprises guide means having an anchor portion secured to and partially embedded into said foundation wall for permitting removable attachment of said modular barrier means to said foundation wall; said guide means further comprising a substantially vertical guide rail for providing vertically controlled removal of said modular barrier means out of said hydrogeologic environment; and
   (d) a porous geotextile material disposed between said porous medium means and said modular barrier means for providing substantial discontinuity between said hydrogeologic environment and said porous medium means upon removal of said modular barrier means.

2. The structure of claim 1 wherein said modular barrier means comprises a plurality of web hook means for retaining said porous geotextile material 3. The structure of claim 2 wherein said web hook means are disposed for releasing said geofabric material upon removal of said modular barrier means from said hydrogeologic environment.

4. The structure of claim 3 wherein said modular barrier means comprises an oblique angular surface for facilitating removal of said modular barrier means from said hydrogeologic environment.

5. The structure of claim 4 wherein said modular barrier means comprises a plurality of interlocking webs, each of said webs having a vertically disposed interlocking member.

6. The structure of claim 5 wherein each of said interlocking members comprises a vertically oriented guide rail.

7. A below-grade textural break foundation wall structure for inhibiting diffusion and advection of liquids and gases into and from a surrounding hydrogeologic environment, comprising:
   (a) a concrete foundation wall having an interior containment area and an exterior surface thereon;
   (b) a porous medium means disposed around substantially all of said exterior surface;
   (c) a geofabric material disposed around said porous medium; and,
   (d) a modular barrier comprising a plurality of interlocking angle webs connected to said foundation wall by a plurality of vertically oriented guide rails, said interlocking angle webs comprising web hooks for selectively attaching said geofabric material to said modular barrier, said interlocking angle webs comprising an oblique angular surface for facilitating removal of said webs from said hydrogeologic environment.

8. A method of inhibiting diffusion and advection of liquids and gases between a foundation wall and its surrounding hydrogeologic environment, comprising:
   (a) providing a foundation wall having an interior and an exterior surface thereon, said foundation wall comprising guide rail means anchored thereon;
   (b) disposing a porous medium around a portion of said exterior surface of said foundation wall;
   (c) disposing a modular barrier means around a portion of said porous medium and attaching said modular barrier to said guide rail means.

9. The method of claim 8 further comprising a porous geotextile material disposed between said porous medium and said modular barrier means.

10. The method of claim 9 wherein said modular barrier means comprises a plurality of web hook means, said method disposing said geotextile material onto said web hook means for retaining said geotextile material onto said modular barrier means.

11. The method of claim 10 wherein said modular barrier means comprises a plurality of interlocking angle webs having vertically oriented guide rails.

12. The method of claim 11 wherein said porous medium is disposed within a containment area defined by the exterior surface of said foundation wall and said geotextile material disposed on said modular barrier means.

13. The method of claim 12 wherein said modular barrier means comprises an oblique angular surface for facilitating removal of said modular barrier means from said hydrogeologic environment.

14. The method of claim 13 comprising removing said modular barrier means from said hydrogeologic environment.

15. The method of claim 14 comprising removing said modular barrier means by individually removing each of said interlocking angle webs.

16. The method of claim 15 comprising disposing back fill soil against said geotextile material after said interlocking angle webs have been removed from said hydrogeologic environment.

* * * * *